US010201979B1

(12) United States Patent
Weimer

(10) Patent No.: US 10,201,979 B1
(45) Date of Patent: Feb. 12, 2019

(54) FLUID LEVEL SENSOR WITH ORIENTATION INDICATOR

(71) Applicant: Xerox Corporation, Norwalk, CT (US)

(72) Inventor: Blake T. Weimer, Woodburn, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/675,997

(22) Filed: Aug. 14, 2017

(51) Int. Cl.
*B41J 2/175* (2006.01)
*G01F 25/00* (2006.01)

(52) U.S. Cl.
CPC .................................. *B41J 2/17566* (2013.01)

(58) Field of Classification Search
CPC ........................... B41J 2/17566; G01F 25/0061
See application file for complete search history.

(56) References Cited

U.S. PATENT DOCUMENTS 4,609,796 A 9/1986 Bergsma
5,727,421 A * 3/1998 Murphy ................ G01F 23/242
200/190
5,742,999 A 4/1998 Gomez, Jr.
9,162,457 B1 * 10/2015 Li ........................ B41J 2/14233
2003/0046997 A1 3/2003 Waller
2004/0200278 A1 10/2004 Gansebom
2006/0027018 A1 2/2006 Summer et al.
2013/0160871 A1 6/2013 Mawhinnery et al.

* cited by examiner

*Primary Examiner* — Jason S Uhlenhake
(74) *Attorney, Agent, or Firm* — Maginot Moore & Beck LLP

(57) ABSTRACT

A fluid level sensor has a sensing element mounted to the end of a member that requires a predetermined orientation for accurate fluid level detection. A knob on the housing of the sensor operatively connected to the member includes an orientation indicator. The member includes a thread that extends a distance along the member that corresponds to a thickness of the wall into which the member of the fluid level sensor is inserted. A portion of the thread extends beyond the wall to enable bidirectional rotation of the knob to position the element for accurate fluid level detection while a portion of the thread remains within an opening in the wall to enable pressure to be applied to an O-ring seal mounted about the member to prevent leakage from the bore.

17 Claims, 4 Drawing Sheets

FLUID LEVEL SENSOR WITH ORIENTATION INDICATOR

TECHNICAL FIELD

This disclosure relates generally to a fluid level sensor, and more particularly, to fluid level sensors that require the sensing element to have a particular orientation to identify fluid levels accurately.

BACKGROUND

Fluid level sensors are useful for monitoring the level of a fluid in a source and generating a signal indicative of a low fluid level to enable replenishing of the fluid. One area in which fluid level sensors are advantageous is printing. Most printheads are produced with an internal reservoir in which marking material is stored and ejected by the ejectors fluidly connected to the reservoir. In response to a fluid level sensor generating the signal indicative of a low ink level, a controller operates a pump to move additional marking material from an external source of marking material to the reservoir in the printhead. Thus, the printer can continue to operate rather than requiring operator intervention to replenish the reservoirs in the printheads.

Some fluid level sensors have a sensing element with a configuration that requires a particular orientation in the fluid so the fluid level can be identified accurately. Because the sensing element typically cannot be seen when the sensing element is inserted into the reservoir or other fluid container, positioning the sensor for proper operation can be difficult. A fluid level sensor that facilitates orienting the sensing element of the fluid level sensor correctly would be beneficial.

SUMMARY

A new fluid level sensor enables the sensing element to be oriented in a fluid that enables accurate detection of the fluid level. The sensor includes a sensing element having an electrical parameter that changes with reference to an amount of a fluid contacting the sensing element, the sensing element being configured to identify most accurately a fluid level when the sensing element is positioned at a predetermined orientation in the fluid, a sensing circuit that is operatively connected to the sensing element, the sensing circuit being configured to generate an electrical signal indicative of changes in the electrical parameter of the sensing element, and a housing in which the sensing circuit is positioned and that supports the sensing element, the housing having a knob with an orientation indicator that is configured to identify the orientation of the sensing element when the sensing element is positioned in fluid to enable the fluid level sensor to be oriented at the predetermined orientation that enables the fluid level to be most accurately identified.

A printing system includes fluid level sensors in the printheads of the system that enables the sensing elements of the sensors to be oriented in the reservoirs of the printheads for accurate detection of the fluid levels in the reservoirs. The system includes a printhead, the printhead being configured to eject marking material, a supply of marking material fluidly connected to a reservoir of marking material within the printhead, a pump operatively connected between the marking material supply and the printhead, the pump being configured to move marking material from the marking material into the reservoir with the printhead, a fluid level sensor that is in fluid communication with a volume within the reservoir in the printhead. The fluid level sensor has a sensing element having an electrical parameter that changes with reference to an amount of a fluid contacting the sensing element, the sensing element being configured to identify most accurately a fluid level when the sensing element is positioned at a predetermined orientation in the fluid, a sensing circuit that is operatively connected to the sensing element, the sensing circuit being configured to generate an electrical signal indicative of changes in the electrical parameter of the sensing element, and a housing in which the sensing circuit is positioned and that supports the sensing element, the housing having a knob with an orientation indicator that is configured to identify the orientation of the sensing element when the sensing element is positioned in fluid to enable the fluid level sensor to be oriented at the predetermined orientation that enables the fluid level to be most accurately identified. A controller is operatively connected to the pump and the fluid level sensor. The controller is configured to receive the signal indicative of the fluid level in the reservoir of the printhead and to operate the pump to move marking material from the marking material supply into the reservoir within the printhead in response to the controller detecting from the signal received from the fluid level sensor that the reservoir needs replenishing with marking material.

BRIEF DESCRIPTION OF THE DRAWINGS

The foregoing aspects and other features of the printing system and the new fluid level sensor noted above are explained in the following description, taken in connection with the accompanying drawings.

DETAILED DESCRIPTION

Figure 1:
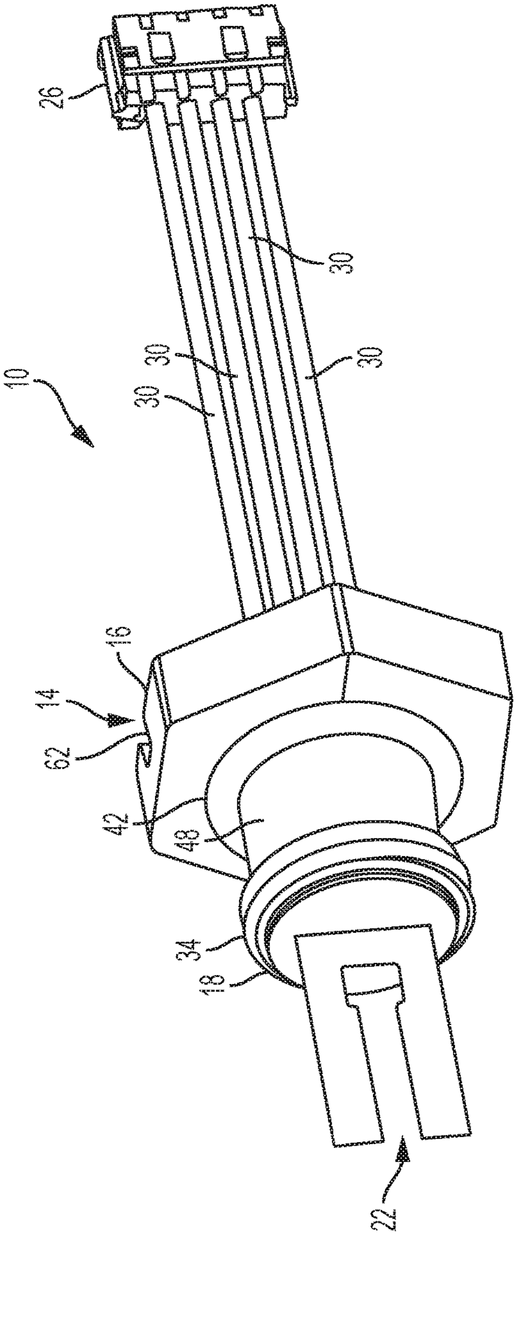
FIG. 1 is a perspective view of a fluid level sensor that incorporates an indicator for identifying the orientation of the sensing element in a reservoir.

For a general understanding of the present embodiments, reference is made to the drawings. In the drawings, like reference numerals have been used throughout to designate like elements.

FIG. 1 is a perspective view of a fluid level sensor 10 that is configured with an orientation indicator. The sensor 10 includes a housing 14, a sensing element support 18, a sensing element 22, and an electrical connector 26 that is electrically coupled to a sensing circuit 60 (FIG. 2B) within the housing 14 by electrical conductors 30. The housing 14 has a knob 16 and an extension 48. The knob 16 is depicted with a hexagonal structure, although other shapes can be used. The shape should facilitate gripping and rotating of the housing so the sensor can be inserted within an opening in a fluid container and oriented for accurate fluid level detection. For example, other polygonal shapes could be used and even a cylindrical shape could be used, provided the outer circumference of the cylinder is knurled to facilitate gripping of the housing.

Extension 48 extends from the knob 16 and terminates into the sensing element support 18. The thread 34 circumferentially winds over at least a portion of the extension 48. The thread 34 and support 18 should have an appropriate diameter for engaging a threaded opening in the wall of a container or reservoir in which the sensor 10 is to be installed and thread 34 should be complementary to the threaded opening. In one embodiment useful for monitoring a marking material level in a printhead, the thread 34 of the support 18 has a ½ inch diameter and a 20 thread per inch unified fine (UNF) count. The support also includes a slot 38 (FIG. 2A) through which the sensing element 22 extends. After the sensing element 22 is extended through the slot 38, a fluid resistant material is applied around the element at the slot to form a barrier to fluid that might flow past the sensing element into the housing 14.

Figure 3:
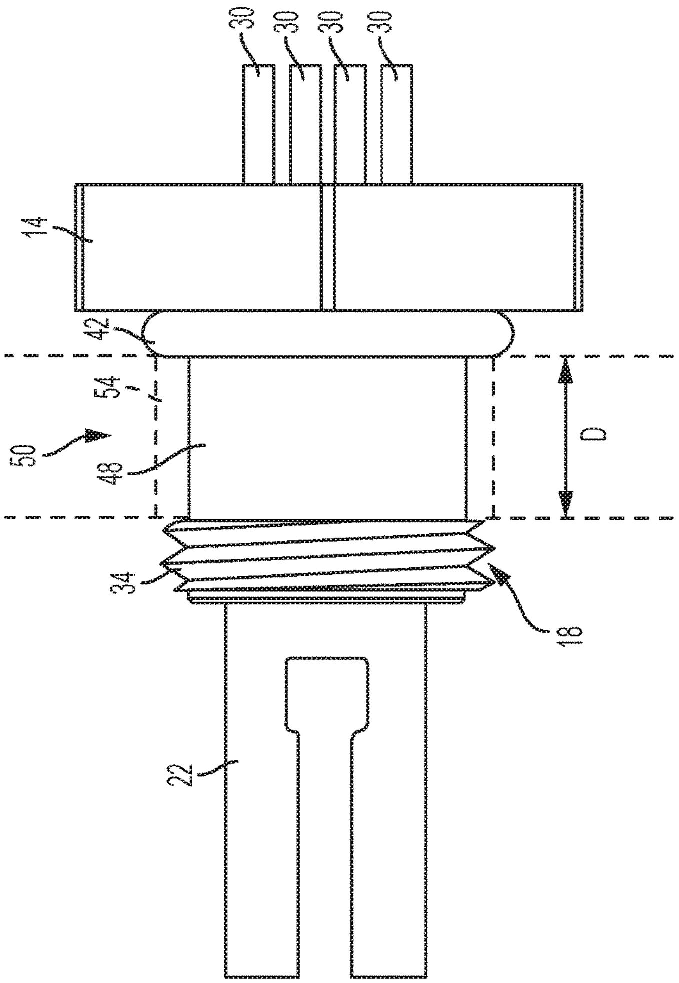
FIG. 3 is a side perspective view of the sensor shown in FIG. 1 inserted in an opening in a wall of a reservoir in a printhead.

The sensing element 22 is formed from a material having a predetermined electrical parameter. As used in this document, "electrical parameter" means an electrical property that changes with reference to an amount of fluid contacting a sensing element. Such electrical properties include, but are not limited to, resistance, capacitance, inductance, and the like. The sensing element shown in the figures is a generally U-shaped member having two legs separated from one another along a portion of each leg to form a two-prong flex circuit, although other types of sensing elements can be used. The material in such a two-prong flex circuit can be, for example, a dielectric so the two prongs form a capacitor. Other examples include materials useful for forming inductors or other electrical components. The sensing element 22 is configured to identify most accurately a level of a fluid contacting the element when the sensing element is positioned within the fluid at a predetermined orientation. When the sensing element 22 shown in the figures is inserted into a reservoir at the proper predetermined orientation, the electrical parameter changes with reference to both legs being in the fluid, only one leg being in the fluid, and both legs being out of the fluid. This type of interaction between the sensing element and the fluid occurs best when both legs of the sensing element are positioned in a vertical configuration. That is, one leg is directly above the other leg and the two legs lie in a vertical plane. If the sensing element 22 is not oriented as shown in FIG. 3, changes in the fluid level do not affect the two legs of the sensing element 22 as described above so the fluid level cannot be accurately sensed. As the electrical parameter changes, the electrical sensing circuit 60 within the housing 14 that is electrically coupled to the sensing element 22 generates an electrical signal that is indicative of the amount of fluid in contact with the sensing element. This signal is electrically coupled to a controller through the conductors 30 and the connector 26 so the controller can operate a pump with reference to the signal to replenish fluid within the monitored reservoir as it is needed. As used in this document, the term "sensing element" refers to a component having an electrical parameter that changes with reference to an amount of fluid contacting the element and is configured so the sensing element most accurately identifies a fluid level at a predetermined orientation.

As shown in FIG. 3, the sensor 10 can also include an O-ring seal 42 made of a material resistant to the fluid in the reservoir being monitored. The O-ring seal 42 fits snugly about the cylindrical extension 48 of the housing 14 that terminates into the support 18. The O-ring seals an opening 54 in a wall 50 in which the support 18 and sensing element 22 are inserted. As shown in FIG. 3, the end of the thread 34 proximal to the knob 16 of the housing 14 is separated from the portion of the O-ring seal 42 that abuts opening 54 in the reservoir wall 50 by a distance D. This distance D corresponds to the thickness of the wall 50 to enable the end of the thread to extend a short distance past the end of the opening 54 in wall 50 that is distal from the seal 42 while a portion of the thread remains within the opening 54. Because the end of the thread 34 extends past the thread within the opening 54 while a portion remains within the opening, the knob 16 of the housing 14 can be rotated bi-directionally to position the sensing element 22 at the correct orientation for the accurate operation of the sensor and the presence of a portion of the thread within the opening 54 maintains a pressure on the O-ring seal. At this position, the pressure on the O-ring seal 42 maintains a seal at the end of the opening 54 of the wall 50 adjacent to the knob 16 so no fluid seeps out. When the sensor is replaced or examined, the knob 16 of the housing 14 is rotated in the direction that enables the end of the thread 34 to re-enter the distal end of the opening 54 and back out of the opening 54 in the wall 50.

In alternative embodiments not having an O-ring seal 42, the distance D lies between the end of the cylindrical extension 48 and the face of the knob 16 that abuts the wall 50 and this distance is reduced so the end of the thread 34 proximal to the knob 16 does not exit the opening 54. In these embodiments, the presence of the thread in the opening helps keep fluid from flowing through the opening 54. The distance D is slightly less than the length of the opening 54 to ensure that the thread 34 remains within the opening 54, but the housing 14 is still capable of being bi-directionally rotated to orient the sensing element 22 appropriately as described below. As the knob 16 approaches the wall 50, the installer can observe that the sensing element 22 is reaching the position of appropriate extension into the reservoir and that rotation of the knob 16 needs to stop at the position where the orientation indicator signals the sensing element 22 is at the orientation for accurate sensor operation.

Figure 2B:
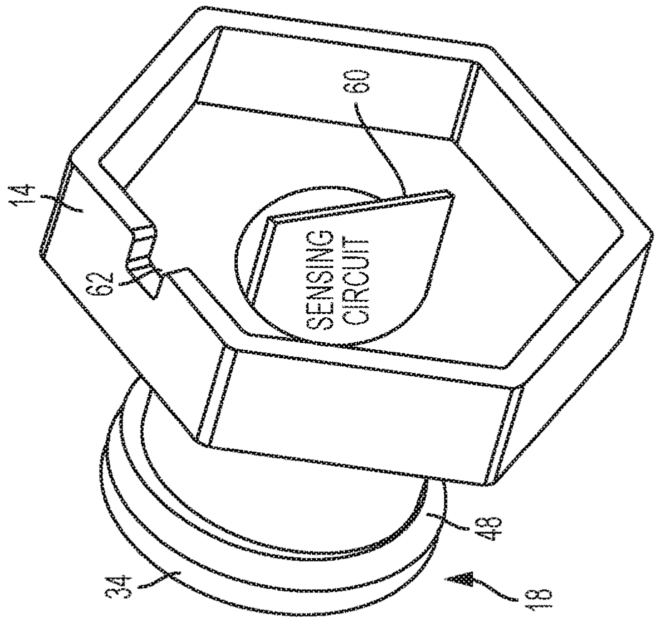
FIG. 2B is a rear perspective view of the housing of the sensor shown in FIG. 1.
Figure 2A:
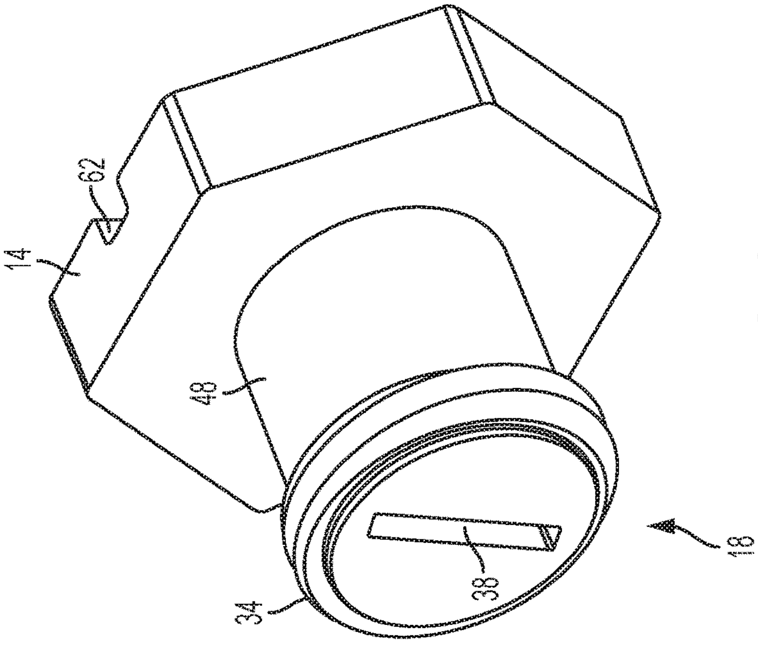
FIG. 2A is a front perspective view of the housing of the sensor shown in FIG. 1.

As shown in FIG. 1, FIG. 2A, and FIG. 2B, the knob 16 of the housing 14 has an indicator 62 that is positioned on the knob to indicate the correct orientation of the sensing element 22 for accurate sensor operation. In FIG. 2B, the back plane of the housing 14 has been removed to expose the sensing circuit 60 and to simplify the figure. The sensing circuit 60 is configured to detect the changes in the electrical parameter of the sensing element 22 affected by the amount of fluid contacting the sensing element. The indicator 62 can be a cutout as shown in the figures or it can be other indicia, such as an etched line or groove, printed or painted mark, or the like. As used in this document, the term "orientation indicator" refers to a feature located on the sensor housing that enables the orientation of the sensing element 22, such as the illustrated flex circuit, of the fluid level sensor to be ascertained. The indicator 62 shown in FIGS. 1, 2A, and 2B is a cutout having a midpoint that is parallel to or aligned with a plane formed by the legs of the U-shaped flex circuit. Similarly, an etched line, groove, and printed or painted mark can be aligned with or be parallel to the plane formed by the prongs of the flex circuit. The indicator 62 is positioned on the knob 16 so the indicator signals that the sensor is in the proper orientation when the indicator on the knob is at the twelve o'clock position. Although the sensor 10 is functional when the indicator is at the eleven o'clock or the one o'clock positions, it best performs its level indicating function when the indicator is at the twelve o'clock position because one leg is directly over the other leg at that position.

Figure 4:
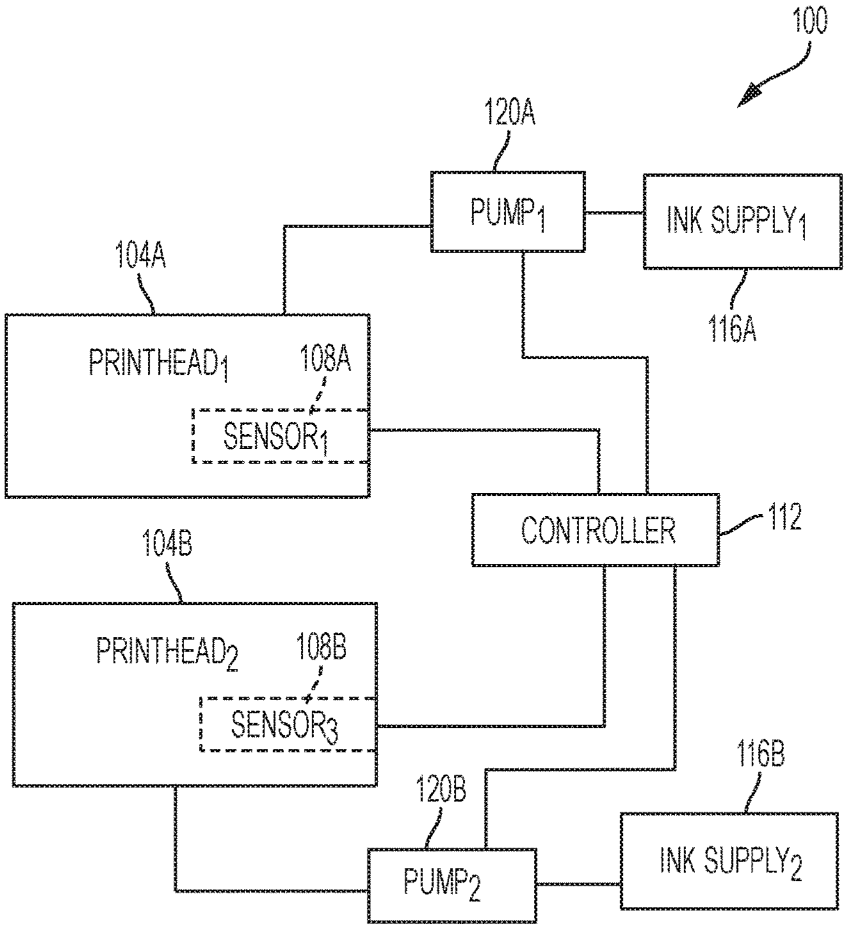
FIG. 4 is a block diagram of a printer having printheads that are configured with the fluid level sensor of FIG. 1.

A printing system 100 having printheads 104A and 104B that are configured with sensors 108A and 108B, respectively, to enable proper orientation of the sensors within the printheads is shown in FIG. 4. The sensors 108A and 108B are installed in the printheads 104A and 104B, respectively, as described above with the indicators on the knobs of the sensor housings being positioned at the twelve o'clock position. The signals generated by the sensing circuits in the sensors are electrically coupled to the controller 112 and the controller 112 is configured with programmed instructions that enable the controller to detect when a sensor is generating a signal indicative of a low fluid level in a printhead. Pump 120A is operatively connected between a marking material, such as ink, supply 116A and printhead 104A to enable the pump to move marking material from marking material supply 116A to printhead 104A. Likewise, pump 120B is operatively connected between marking material supply 116B and printhead 104B to enable the pump to move marking material from marking material supply 116B to printhead 104B. The controller 112 is further configured to operate the pumps 120A and 120B independently to replenish marking material within the printheads 104A and 104B, respectively, in response to the controller detecting a signal from the sensors 108A and 108B, respectively, that the low fluid level has occurred in the printhead in which the sensor is installed.

It will be appreciated that variations of the above-disclosed apparatus and other features, and functions, or alternatives thereof, may be desirably combined into many other different systems or applications. For example, while the embodiments described above have been illustrated with a vertical configuration, the printing system and the object rotating subsystem can be configured for moving an object through a printer in other directions. Various presently unforeseen or unanticipated alternatives, modifications, variations, or improvements therein may be subsequently made by those skilled in the art, which are also intended to be encompassed by the following claims.

What is claimed is:

1. A fluid level sensor comprising:

a sensing element having an electrical parameter that changes with reference to an amount of a fluid contacting the sensing element, the sensing element being configured to identify most accurately a fluid level when the sensing element is positioned at a predetermined orientation in the fluid and the sensing element being a generally U-shaped member having two legs separated from one another along a portion of each leg;

a sensing circuit that is operatively connected to the sensing element, the sensing circuit being configured to generate an electrical signal indicative of changes in the electrical parameter of the sensing element; and a housing in which the sensing circuit is positioned and that supports the sensing element, the housing having;

a cylindrical extension, a thread circumferentially encircling at least a portion of the cylindrical extension, the thread being complementary to a threaded opening in a wall of a reservoir to enable the cylindrical extension to be advanced into the opening in the wall by rotating the housing to position the sensing element within a volume of the reservoir, a cutout in a knob that identifies the predetermined orientation of the sensing element when the sensing element is positioned in fluid to enable a greater amount of fluid to contact both legs of the sensing element and to enable a lesser amount of fluid to contact only one leg of the sensing element; and an O-ring seal that encircles the cylindrical extension between the thread and the knob and is separated from an end of the thread that is proximal to the knob by a distance that corresponds to a thickness of a wall of the reservoir.

2. The fluid level sensor of claim 1, the knob of the housing being configured in a polygonal shape.

3. The fluid level sensor of claim 2 wherein the polygonal shape is a hexagon.

4. The fluid level sensor of claim 1, the cylindrical extension including a slot through which the sensing element extends.

5. The fluid level sensor of claim 1 further comprising:

an electrical connector; and a plurality of electrical conductors electrically coupled between the electrical connector and the sensing circuit.

6. A printing system comprising:

a printhead, the printhead being configured to eject marking material;

a supply of marking material fluidly connected to a reservoir of marking material within the printhead;

a pump operatively connected between the marking material supply and the printhead, the pump being configured to move marking material from the marking material into the reservoir with the printhead;

a fluid level sensor that is in fluid communication with a volume within the reservoir in the printhead, the fluid level sensor having:

a sensing element having an electrical parameter that changes with reference to an amount of a fluid contacting the sensing element, the sensing element being configured to identify most accurately a fluid level when the sensing element is positioned at a predetermined orientation in the fluid and the sensing element being a generally U-shaped member having two legs separated from one another along a portion of each leg;

a sensing circuit that is operatively connected to the sensing element, the sensing circuit being configured to generate an electrical signal indicative of changes in the electrical parameter of the sensing element; and a housing in which the sensing circuit is positioned and that supports the sensing element, the housing having;

a cylindrical extension, a thread circumferentially encircling at least a portion of the cylindrical extension, the thread being complementary to a threaded opening in a wall of a reservoir to enable the cylindrical extension to be advanced into the opening in the wall by rotating the housing to position the sensing element within a volume of the reservoir, a cutout in a knob that identifies the predetermined orientation of the sensing element when the sensing element is positioned in fluid that enables a greater amount of fluid to contact both legs of the sensing element and that enables a lesser amount of fluid to contact only one leg of the sensing element; and an O-ring seal that encircles the cylindrical extension between the thread and the knob and is separated from an end of the thread that is proximal to the knob by a distance that corresponds to a thickness of a wall of the reservoir; and a controller operatively connected to the pump and the fluid level sensor, the controller being configured to receive the signal indicative of the fluid level in the reservoir of the printhead and to operate the pump to move marking material from the marking material supply into the reservoir within the printhead in response to the controller detecting from the signal received from the fluid level sensor that the reservoir needs replenishing with marking material.

7. The printing system of claim 6, the knob of the housing being configured in a polygonal shape.

8. The printing system of claim 7 wherein the polygonal shape is a hexagon.

9. The printing system of claim 6, the cylindrical extension including a slot through which the sensing element extends.

10. The printing system of claim 6 further comprising:

an electrical connector; and a plurality of electrical conductors electrically coupled between the electrical connector and the sensing circuit.

11. A fluid level sensor comprising:

a sensing element having an electrical parameter that changes with reference to an amount of a fluid contacting the sensing element, the sensing element being configured to identify most accurately a fluid level when the sensing element is positioned at a predetermined orientation in the fluid;

a sensing circuit that is operatively connected to the sensing element, the sensing circuit being configured to generate an electrical signal indicative of changes in the electrical parameter of the sensing element; and a housing in which the sensing circuit is positioned and that supports the sensing element, the housing including:

a cylindrical extension;

a thread circumferentially encircling at least a portion of the cylindrical extension, the thread being complementary to a threaded opening in a wall of a reservoir to enable the cylindrical extension to be advanced into the opening in the wall by rotating the housing to position the sensing element within a volume of the reservoir;

a knob with an orientation indicator that is affixed to the cylindrical extension and is configured to identify the predetermined orientation of the sensing element in the reservoir that enables the fluid level sensor to most accurately identify a level of the fluid in the reservoir; and an O-ring seal that encircles the cylindrical extension between the thread and the knob, the O-ring seal is separated from an end of the thread that is proximal to the knob by a distance that corresponds to a thickness of a wall of the reservoir.

12. The fluid level sensor of claim 11 wherein the sensing element is a generally U-shaped member having two legs separated from one another along a portion of each leg and a connecting portion that connects the two legs to one another at another portion of each leg; and the orientation indicator is configured to identify the predetermined orientation at which the two legs lie in a plane that is perpendicular to a surface of the fluid in the reservoir.

13. The fluid level sensor of claim 12, the orientation indicator further comprising:

a cutout in the knob of the housing.

14. The fluid level sensor of claim 13, the knob of the housing being configured in a polygonal shape.

15. The fluid level sensor of claim 14 wherein the polygonal shape is a hexagon.

16. The fluid level sensor of claim 11, the cylindrical extension including a slot through which the sensing element extends.

17. The fluid level sensor of claim 11 further comprising:

an electrical connector; and a plurality of electrical conductors electrically coupled between the electrical connector and the sensing circuit.

* * * * *